US011195141B2

(12) United States Patent
Cox

(10) Patent No.: US 11,195,141 B2
(45) Date of Patent: Dec. 7, 2021

(54) FULFILMENT MANAGEMENT IMPLEMENTING PHYSICAL TASK INTERACTION

(71) Applicant: Shipping Easy Group, Inc., Austin, TX (US)

(72) Inventor: Barry Neal Cox, Georgetown, TX (US)

(73) Assignee: ShippingEasy Group, Inc., Austin, TX (US)

( * ) Notice: Subject to any disclaimer, the term of this patent is extended or adjusted under 35 U.S.C. 154(b) by 638 days.

(21) Appl. No.: 15/950,814

(22) Filed: Apr. 11, 2018

(65) Prior Publication Data

US 2019/0318300 A1 Oct. 17, 2019

(51) Int. Cl.
*G06Q 10/08* (2012.01)
*G06Q 10/06* (2012.01)

(52) U.S. Cl.
CPC ....... *G06Q 10/087* (2013.01); *G06Q 10/0633* (2013.01); *G06Q 10/0639* (2013.01); *G06Q 10/063114* (2013.01); *G06Q 10/083* (2013.01)

(58) Field of Classification Search
CPC ......... G06Q 10/087; G06Q 10/063114; G06Q 10/0633; G06Q 10/0639; G06Q 10/083
See application file for complete search history.

(56) References Cited

U.S. PATENT DOCUMENTS

| 10,282,696 | B1* | 5/2019 | Bettis | G06Q 10/087 |
|---|---|---|---|---|
| 2018/0286404 | A1* | 10/2018 | Cech | G10L 25/48 |
| 2019/0107411 | A1* | 4/2019 | Gil | G06T 19/006 |
| 2020/0225655 | A1* | 7/2020 | Cella | G06N 3/0472 |

* cited by examiner

*Primary Examiner* — Florian M Zeender
*Assistant Examiner* — Joseph M Mutschler
(74) *Attorney, Agent, or Firm* — Norton Rose Fulbright US LLP

(57) ABSTRACT

Systems and methods which provide physical task interaction control with respect to fulfillment management systems used in order fulfillment management are described. A physical task interaction controller may be provided in association with a fulfillment management system, whereby a user interface is configured to provide physical task interaction control for one or more functions of the fulfillment management systems by shipper personnel. A physical task interaction controller of embodiments may comprise a natural protocol engine, an augmented reality engine, and an artificial intelligence engine. The physical task interaction control of embodiments facilitates shipper personnel interacting with, and controlling operations of, the fulfillment management system relevant to a fulfillment physical task currently being performed by the shipper personnel without either the need for separate personnel to perform the digital tasks or the shipper personnel having to leave the fulfillment physical tasks.

13 Claims, 3 Drawing Sheets

FULFILMENT MANAGEMENT IMPLEMENTING PHYSICAL TASK INTERACTION

TECHNICAL FIELD

The invention relates generally to management of order fulfillment and, more particularly, to providing physical task interaction control with respect to fulfillment management systems used in order fulfillment management.

BACKGROUND OF THE INVENTION

Various shippers, such as online merchants, electronic marketplace (e.g., eBay, Amazon Marketplace, etc.) sellers, etc. provide for the sale and shipment of items to recipients, such as purchasers, gift recipients, and the like via one or more shipping service providers (e.g., the United States Postal Service (USPS), United Parcel Service (UPS), Federal Express (FedEx), Dalsey, Hillblom and Lynn (DHL), and local and regional couriers). For example, with the advent of the Internet, e-commerce merchants process large numbers of orders for shipping items to innumerable recipients daily. Such processing typically comprises order fulfillment wherein the particular items for each order are gathered and packaged for shipment, suitable shipping documentation is prepared (e.g., shipping labels, shipping manifests, shipping service provider forms, etc.), and various related functions are performed (e.g., providing communications to intended recipients and/or purchasers, inventory management, accounting, etc.).

A number of systems have been developed for use in managing various functions associated with the fulfillment of orders and shipment of the items. For example, fulfillment management systems, such as the SHIPPINGEASY fulfillment and shipping management system provided by ShippingEasy, Inc. of Austin Tex., provide functionality for the management of item orders, managing the picking and packing of items for order fulfillment, generation of invoices, packing slips, manifests, shipping labels, and postage or other prepaid shipping indicia, and tracking of shipment of items through a shipping service provider.

Such fulfillment and shipping management systems generally interface with shippers using traditional user interface paradigms. In particular, shipper personnel typically utilize one or more user terminals (e.g., personal computer workstation, tablet device, etc.) in a digital data session for performing specific functions, such as printing a pick ticket, printing a packing list, generating and printing a shipping label, or querying a shipment status. Although physical tasks, such as picking items from inventory, packing items into shipping containers, attaching shipping documents (e.g., packing lists, shipping labels, shipping manifests, etc.) to shipping containers, or preparing packages for shipping service provider pickup, may be associated with the fulfillment management system digital tasks, either separate personnel are employed for the physical and digital tasks or personnel handling both tasks must leave one task (e.g., physical) to perform the other (e.g., digital). The existing user interfaces are not well suited for use when performing the relevant physical tasks to which the fulfillment management system digital tasks may be associated. Moreover, the fulfillment management system digital tasks are limited to certain common functions (e.g., document generation or information presentation), and are not configured for facilitating efficient concurrent performance of fulfillment management system digital tasks and associated physical tasks by a same shipper personnel.

BRIEF SUMMARY OF THE INVENTION

The present invention is directed to systems and methods which provide physical task interaction control with respect to fulfillment management systems used in order fulfillment management. For example, a physical task interaction controller of embodiments may be provided in association with a fulfillment management system, whereby a user interface is configured to provide physical task interaction control for one or more functions of the fulfillment management systems by shipper personnel (e.g., fulfillment facility personnel). The physical task interaction control provided according to embodiments of the present invention facilitates shipper personnel interacting with, and controlling operations of, the fulfillment management system (i.e., performing one or more fulfillment management system digital tasks) relevant to a fulfillment physical task currently being performed by the shipper personnel without either the need for separate personnel to perform the digital tasks or the shipper personnel having to leave the fulfillment physical tasks.

Physical task interaction controllers of embodiments comprise various logic configured to implement physical task interaction control for one or more fulfillment management system digital tasks by shipper personnel efficiently and without the shipper personnel leaving a current fulfillment physical task. For example, a physical task interaction controller may include a natural protocol engine, an augmented reality engine, and/or an artificial intelligence engine providing logic facilitating physical task interaction control for one or more fulfillment management system digital tasks.

Natural protocol engines of embodiments of physical task interaction controllers herein may, for example, facilitate fluid (e.g., unscripted and/or unregimented) interaction with the fulfillment management system by shipper personnel performing various fulfillment physical tasks to simultaneously control one or more functions of the fulfillment management system for performing one or more associated fulfillment management system digital tasks. Embodiments of natural protocol engines may provide emulation of natural human communications in facilitating fluid interaction in accordance with concepts herein. For example, a natural protocol engine of embodiments of the invention may comprise a natural language parsing rule set, language construct database, fulfillment management system operation mapping, and/or other natural language functionality for analyzing shipper personnel free-form commands received by a physical task interaction controller user interface concurrently with performance of an associated fulfillment physical task by the shipper personnel and initiating control of appropriate features of a fulfillment management system based upon the shipper personnel free-form commands. The free-form commands may be issued by shipper personnel as spoken phrases, digital communications (e.g., texts, emails, instant messages, etc.), gestures, and/or other natural human forms of communication, as well as combinations thereof. Accordingly, analysis of various putative triggers is not limited to linguistics (i.e., spoken or written language), and may include other communicative messages (e.g., natural language parsing rule sets, language construct databases, and other natural language functionality for analyzing shipper personnel free-form commands may be configured for operation with respect to non-spoken/written language, such as gestures). Irrespective of the particular form of the shipper personnel free-form commands, a natural protocol engine of embodiments operates to transform such free-form commands to appropriate control commands for implementing desired functionality of the fulfillment management system in association with the fulfillment physical task being performed by the shipper personnel. A natural protocol engine of embodiments may additionally or alternatively operate to analyze fulfillment management system digital task control information (e.g., responses, user prompts, information solicitations, etc.) and transform the digital task control information into a form emulating natural human communications, such as using fulfillment management system operation mapping, language construct database, a natural language grammar rule set, and/or other natural language data.

Augmented reality engines of embodiments of physical task interaction controllers herein may, for example, provide guidance to shipper personnel performing various fulfillment physical tasks, such as to facilitate efficiency with respect to performing the tasks (e.g., shipper personnel efficiency, resource utilization efficiency, etc.), by simultaneously performing one or more fulfillment management system digital tasks to identify and deliver augmentation information to the shipper personnel relevant to efficient performance of the fulfillment physical task. Embodiments of augmented reality engines may provide perceptual information (e.g., appropriate/relevant visual, auditory, haptic, somatosensory, and/or olfactory information) overlaid in a live view (e.g., direct or indirect view) presented to the shipper personnel in accordance with concepts herein. For example, an augmented reality engine of embodiments of the invention may comprise a fulfillment physical task workflow database, a fulfillment physical task workflow guidance rule set, an inventory detail database, fulfillment physical task guidance information mapping, and/or other reality augmentation functionality for interacting with shipper personnel via a physical task interaction controller user interface concurrently with performance of an associated fulfillment physical task by the shipper personnel. Augmentation of a live view perceived by shipper personnel with fulfillment physical task guidance information by an augmented reality engine of embodiments may be in response to commands or requests issued by shipper personnel (e.g., as spoken phrases, digital communications, gestures, etc.). Accordingly, it should be appreciated that various features of an augmented reality engine may operate in cooperation with functionality of a natural protocol engine. Additionally or alternatively, augmentation of a live view perceived by shipper personnel with fulfillment physical task guidance information by an augmented reality engine of embodiments may be in response to physical task interaction controller determining that shipper personnel is performing a particular aspect of a fulfillment physical task workflow for which relevant fulfillment physical task guidance is available (e.g., without a command or request from shipper personnel). Irrespective of the particular way in which augmentation of a live view perceived by shipper personnel with fulfillment physical task guidance information is initiated, an augmented reality engine of embodiments operates to facilitate performing one or more fulfillment management system digital tasks and provide guidance information to shipper personnel relevant to efficient performance of associated fulfillment physical tasks simultaneously with the shipper personnel performing an associated fulfillment physical task.

Artificial intelligence engines of embodiments of physical task interaction controllers herein may, for example, provide self-learning operation to modify operation of one or more aspect of the physical task interaction controller based upon previous operation and aspects thereof. For example, artificial intelligence engines of embodiments may include self-learning fuzzy logic algorithms configured to learn from operations performed using the physical task interaction controller and understand aspects of normal behavior (e.g., as distinguished from abnormal or unusual behavior), wherein various assumptions (e.g., for use in facilitating fluid interaction with the fulfillment management system by shipper personnel and/or providing guidance to shipper personnel performing various fulfillment physical tasks) may be made based upon the observed operations. In operation according to embodiments, assumptions and/or other information learned from operations observed by logic of an artificial intelligence engine is used to refine or otherwise modify one or more rule sets (e.g., a natural language parsing rule set, a natural language grammar rule set, a fulfillment physical task workflow guidance rule set, etc.) utilized by physical task interaction controllers of embodiments. Accordingly, it should be appreciated that embodiments of an artificial intelligence engine may operate in cooperation with a natural protocol engine, such as for analyzing shipper personnel free-form commands and/or fulfillment management system digital task control information and modifying one or more aspect of the natural protocol engine based upon the analysis and aspects of normal behaviors determined therefrom. Additionally or alternatively, embodiments of an artificial intelligence engine may operate in cooperation with an augmented reality engine, such as for analyzing fulfillment physical task workflows, aspects of fulfillment physical tasks, etc. and modifying one or more aspect of the augmented reality engine based upon the analysis and aspects of normal behaviors determined therefrom.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
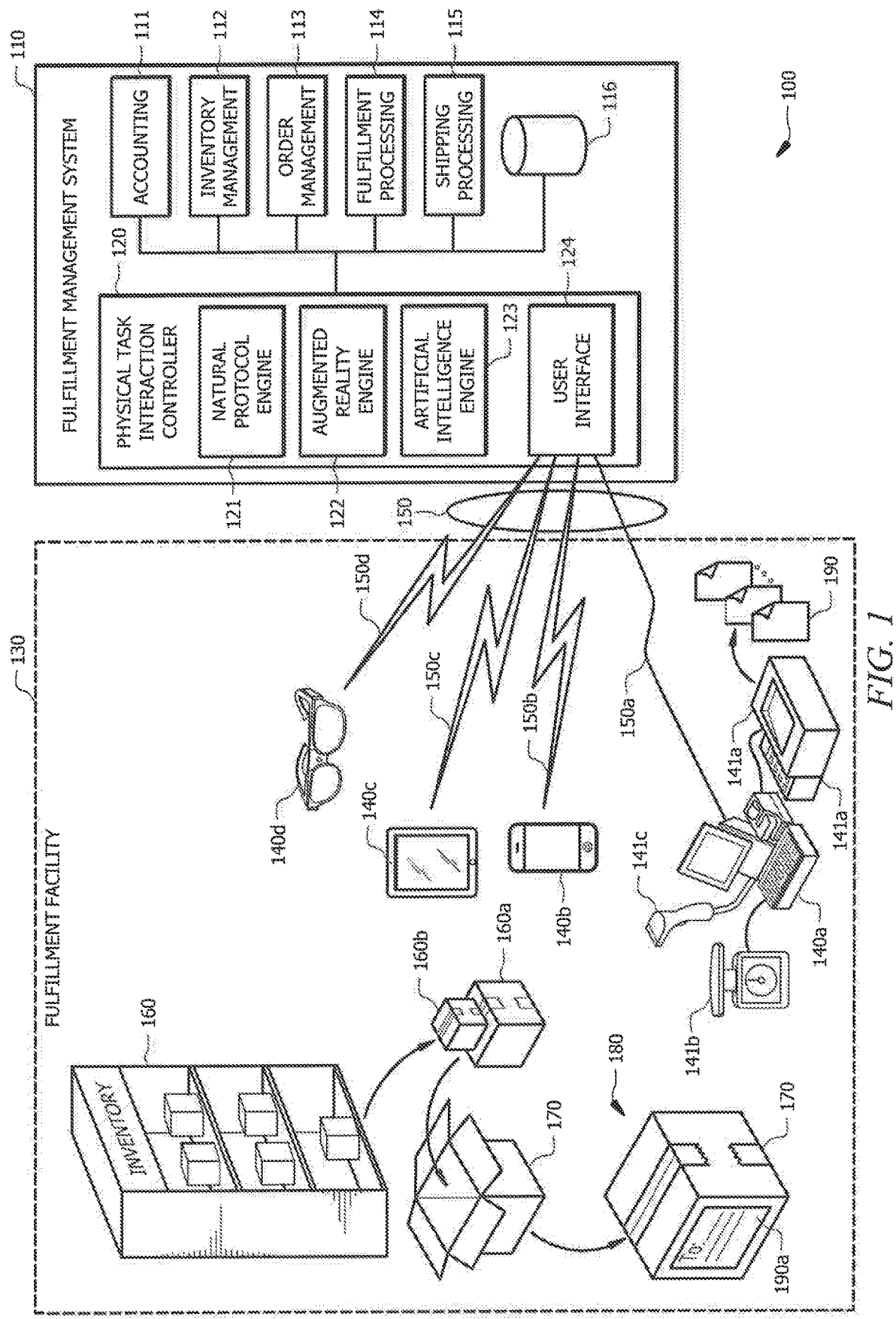
FIG. 1 shows a functional block diagram of a fulfillment management system having a physical task interaction controller of embodiments of the present invention.

FIG. 1 shows an embodiment of system 100 adapted according to concepts of the present invention. In particular, system 100 of the illustrated embodiment includes fulfillment management system 110, operable to provide management functionality with respect to the fulfillment of orders and shipment of the items by one or more shippers. Fulfillment management system 110 may, for example, comprise a system operable to provide the automation of tasks associated with fulfillment of orders and the shipment of items, including management of item orders, managing the picking and packing of items for order fulfillment, generation of invoices, packing slips, manifests, shipping labels, and postage or other prepaid shipping indicia, management of item shipping (e.g., using one or more shipping service providers, such as the USPS, UPS, FedEx, DHL, local couriers, etc.), and/or tracking of shipment of items through a shipping service provider. Accordingly, fulfillment management system 110 of the illustrated embodiment includes various functional blocks configured to provide functionality for fulfillment of orders and shipment of items, such as may comprise one or more fulfillment management applications (e.g., instruction sets, computer executable code, software, etc. providing fulfillment management operation as described herein) shown as accounting 111, inventory management 112, order management 113, fulfillment processing 114, and shipping processing 115. Database 116 may provide storage of various data (e.g., accounting data, inventory data, order data, shipping data, etc.) used by one or more functional blocks of fulfillment management system 110.

Fulfillment management system 110 is adapted in accordance with concepts herein to provide physical task interaction control with respect to functionality used in order fulfillment management. For example, fulfillment management system 110 of the illustrated embodiment includes physical task interaction controller 120. Physical task interaction controller 120 of embodiments of the invention is operable to configure a user interface (e.g., user interface 124) with respect to fulfillment management system 110 to provide physical task interaction control for one or more functions of the fulfillment management systems by shipper personnel, such as fulfillment facility personnel of fulfillment facility 130 performing various fulfillment physical tasks. Physical task interaction control provided by physical task interaction controller 120 may, for example, facilitate such shipper personnel interacting with, and controlling operations of, fulfillment management system 110 to perform one or more fulfillment management system digital tasks (e.g., control functions of the fulfillment management system and/or receive guidance information from the fulfillment management system) relevant to a fulfillment physical task currently being performed by the shipper personnel. Physical task interaction controller 120 of embodiments is configured for controlling performance of such fulfillment management system digital tasks concurrently with respect to one or more associated fulfillment physical task without either the need for separate personnel to perform the digital tasks or the shipper personnel having to leave the fulfillment physical tasks.

Physical task interaction controller 120 of the illustrated embodiment comprises logic for implementing aspects of physical task interaction control for one or more fulfillment management system digital tasks with respect to shipper personnel performing fulfillment physical tasks. In particular, through operation of logic of natural protocol engine 121 and augmented reality engine 122, embodiments of physical task interaction controller 120 may facilitate control of fulfillment management system digital tasks simultaneously with shipper personnel performing one or more associated fulfillment physical tasks. For example, natural protocol engine 121 may facilitate fluid (e.g., unscripted and/or unregimented) interaction between shipper personnel performing various fulfillment physical tasks and fulfillment management system 10 (e.g., via user interface 124) for performing various functionality (e.g., accounting 111, inventory management 112, order management 113, fulfillment processing 114, and shipping processing 115). Natural protocol engine 121 of embodiments may not only provide transformation of natural language commands, instructions, requests, responses, etc. (collectively referred to herein as communicative messages) issued by shipper personnel, but may also provide transformation of fulfillment management system digital task control information (e.g., communicative messages comprising responses, user prompts, information solicitations, etc.) into a form emulating natural human communications (e.g., using fulfillment management system operation mapping, language construct database, a natural language grammar rule set, and/or other natural language data). Additionally or alternatively, augmented reality engine 122 may identify and deliver information from fulfillment management system 110 to shipper personnel (e.g., via user interface 124) relevant to fulfillment physical tasks being performed by such shipper personnel. It should be appreciated that the various data utilized by embodiments of natural protocol engine 121 (e.g., language construct database, fulfillment management system operation mapping, a natural language grammar rule set, natural language data, etc.) and/or augmented reality engine 122 (e.g., fulfillment physical task workflow database, a fulfillment physical task workflow guidance rule set, an inventory detail database, fulfillment physical task guidance information mapping, etc.) may be stored in a database, such as database 116, external to the respective engine.

In addition to logic for implementing aspects of physical task interaction control for one or more fulfillment management system digital tasks with respect to shipper personnel performing fulfillment physical tasks (e.g., natural protocol engine 121 and augmented reality engine 122), the illustrated embodiment of fulfillment management system 110 comprises self-learning logic for implementing modifications based upon observed operation with respect to fulfillment management system 110. In particular, physical task interaction controller 120 of embodiments comprises artificial intelligence logic implementing self-learning rule sets to modify operation of one or more aspect of the physical task interaction controller based upon previous operation and aspects thereof. Artificial intelligence engine 123 preferably operates in cooperation with natural protocol engine 121 (e.g., for analyzing shipper personnel free-form commands and/or fulfillment management system digital task control information and modifying one or more aspect of the natural protocol engine based upon the analysis and aspects of normal behaviors determined therefrom) and/or augmented reality engine 123 (e.g., for analyzing fulfillment physical task workflows, aspects of fulfillment physical tasks, etc. and modifying one or more aspect of the augmented reality engine based upon the analysis and aspects of normal behaviors determined therefrom) to implement modifications based upon observed operation. It should be appreciated that the various data utilized by embodiments of artificial intelligence engine 123 (e.g., self-learning rule sets, fulfillment physical task workflow information, historical behavior information, etc.) and/or augmented reality engine 122 (e.g., fulfillment physical task workflow database, a fulfillment physical task workflow guidance rule set, an inventory detail database, fulfillment physical task guidance information mapping, etc.) may be stored in a database, such as database 116, external to the respective engine.

It should be appreciated that fulfillment management system 110 may be provided in various configurations, such as depending upon the shipper or shippers served, a service provider providing the fulfillment management system, etc. For example, fulfillment management system 110 of embodiments may comprise a local deployment of one or more applications which are stored and executed by computing equipment disposed at one or more shipper locations (e.g., fulfillment facility 130). Additionally or alternatively, fulfillment management system 110 of embodiments may comprises a cloud-based deployment of one or more applications which are stored and executed by computing equipment disposed in the "cloud" of a network (e.g., network 150, such as may comprise the Internet). Irrespective of the particular configuration of fulfillment management system 110 (e.g., local, cloud-based, etc.), functional blocks thereof (e.g., accounting 111, inventory management 112, order management 113, fulfillment processing 114, shipping processing 115, and/or physical task interaction controller 120), or portions thereof, may comprise computer executable code executing on one or more processor-based systems (e.g., general purpose computer systems, network servers, web servers, and/or the like), such as may be coupled to one or more networks for providing data communication with other processor-based systems. Fulfillment management system 110 may, for example, comprise a system providing various desired functionality such as in the form of software as a service (SaaS), infrastructure as a service (IaaS), platform as a service (PaaS), unified communications as a service (UCaaS), etc.

From the foregoing it can be appreciated that fulfillment management system 110 of embodiments comprises one or more processor-based systems operating under control of one or more instruction sets (e.g., software, firmware, applet, etc.) to provide operation as described herein. Such processor-based systems may comprise a central processing unit (CPU) (e.g., a processor from the PENTIUM or CORE line of processors available from Intel Corporation), one or more coprocessors (e.g., graphics processing unit (GPU), math coprocessor, etc.), memory (e.g., random access memory (RAM), read only memory (ROM), flash memory, disk memory, optical memory, etc.) storing the aforementioned one or more instruction sets and/or other data used herein, and appropriate input/output circuitry and devices (e.g., network interface card (NIC), keyboard, digital pointer, display screen, peripheral interface, microphone, speaker, wireless interface, etc.).

Although physical task interaction controller 120 of the illustrated embodiment is shown as being disposed within fulfillment management system 110, other configurations may be adopted in accordance with the concepts herein. For example, physical task interaction controller 120 may be disposed in a separate host processor-based system from that of fulfillment management system 110 of embodiments, wherein fulfillment management system 110 interfaces with various user devices (e.g., user devices of shipper personnel performing fulfillment physical tasks) via the physical task interaction controller.

It should be appreciated that although single instances of both a fulfillment management system and fulfillment facility for which the fulfillment management is utilized are shown for simplicity, embodiments may comprise any number of such instances of any or all. Similarly, although the illustrated embodiment shows a single instance of a physical task interaction controller, embodiments may comprise a plurality of physical task interaction controllers (e.g., to facilitate scaling, to provide distributed implementation of functionality thereof, etc.). Furthermore, it should be appreciated that physical task interaction controllers in accordance with embodiments herein may be provided and utilized other than in combination with a fulfillment management system.

Network 150 of the illustrated embodiment provides communication links facilitating the communication between various systems and components of system 100, such as user devices utilized by shipper personnel (e.g., user devices 140a-140d), recipient and/or shipper systems (not shown), shipping service provider systems (not shown), online merchant systems (not shown), electronic marketplace servers (not shown), database servers (not shown), etc. Accordingly, network 150 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like. Communication links provided by network 150 may comprise wired links (e.g., link 150a) and/or wireless links (e.g., wireless links 150b-150d).

User devices 140a-140d may be utilized by shipper (e.g., merchant, manufacturer, e-commerce seller, fulfillment service provider, etc.) personnel, such as may be performing fulfillment physical tasks within fulfillment facility 130 (e.g., a fulfillment warehouse, e-commerce seller's home office or garage, store stockroom, etc.), for item fulfillment shipments, obtaining information regarding shipments, and the like. User devices 140a-140d of embodiments comprise processor-based systems (e.g., a terminal in the form of one or more computers, workstations, kiosk terminals, portable processor-based devices, servers, etc.) operable under control of one or more instruction sets (e.g., software, firmware, applet, etc.) adapted to cooperate with fulfillment management system 110 to provide desired functionality, such as the aforementioned exemplary fulfillment functionality, augmented by physical task interaction control of physical task interaction controller 120 for one or more functions of the fulfillment management system. User devices 140a-140d are preferably utilized by shipper personnel while performing fulfillment physical tasks, and thus comprise form factors (e.g., a portable computer as shown for user device 140a, a smartphone as shown for user device 140b, a tablet device as shown for user device 140c, a head-mounted display as shown for user device 140d, etc.) that are compatible with particular fulfillment physical tasks for which shipper personnel may perform. The user devices are configured for fluid interaction with the fulfillment management system by shipper personnel performing various fulfillment physical tasks using natural protocol engine 121 and/or receiving guidance with respect to shipper personnel performing various fulfillment physical tasks using augmented reality engine 122. Accordingly, user devices 140a-140d of embodiments comprise one or more resource elements such as microphones, speakers, cameras, high resolution real-time displays, heads up displays, etc. for use in aspects of physical task interaction control. It should be appreciated that, although the illustrated embodiment shows a representative example of the number and configuration of user devices as may be utilized with respect to system 100, the concepts of the present invention are not limited to application to the particular number or configuration of user devices shown.

From the foregoing it can be appreciated that user devices 140a-140d of embodiments comprise processor-based systems operating under control of one or more instruction sets (e.g., software, firmware, applet, etc.) to provide operation as described herein. Such processor-based systems may comprise a central processing unit (CPU) (e.g., a processor from the PENTIUM or CORE line of processors available from Intel Corporation, a processor from the AIX line of processors available from Apple Inc., a processor from the SNAPDRAGON line of processors available from Qualcomm Inc.), one or more coprocessors (e.g., graphics processing unit (GPU), math coprocessor, etc.), memory (e.g., random access memory (RAM), read only memory (ROM), flash memory, disk memory, optical memory, etc.) storing the aforementioned one or more instruction sets and/or other data used herein, and appropriate input/output circuitry and devices (e.g., network interface card (NIC), keyboard, digital pointer, display screen, peripheral interface, microphone, speaker, wireless interface, etc.).

Various peripherals and other resources useful in providing functionality available through or facilitating operation of system 100 may be coupled to or otherwise available for use in association with user devices 140a-140d of embodiments of system 100. For example, resources, such as one or more printers (e.g., thermal printer, ink printer, laser printer, etc.), imaging devices (e.g., optical scanner, barcode scanner, handheld scanner, camera, biometric sample scanner, etc.), scales (e.g., electronic scale, digital scale), and/or the like, may be provided for use in association with fulfillment physical tasks performed by shipper personnel using any of user devices 140a-140d according to embodiments herein. Computing resource 141a, shown in the illustrated embodiment as a printer (e.g., printer for printing proof of payment indicia, bills of lading, manifests, receipts, shipping labels, etc., shown as fulfillment documents 190), is shown as being coupled to user device 140a. Similarly, computing resource 141b, shown as a scale (e.g., an electronic scale for weighing items for shipping), is also shown as being coupled to user device 140a of the illustrated embodiment. Computing resource 141c, shown as an imaging device (e.g., a scanner for obtaining images of shipping items, for scanning barcodes, for scanning addresses or other shipping item information, etc.), is also shown as being coupled to user device 140a of the illustrated embodiment. It should be appreciated that although a computing resource may be coupled to a particular user device (e.g., user device 140a), that computing resource may nevertheless be utilized with respect to fulfillment physical tasks performed by shipper personnel using another user device (e.g., any of user devices 140b-140d). Moreover, although computing resources are illustrated as peripherals to a user device, one or more computing resources may be integrated into user devices (e.g., as cameras integrated into a smartphone, tablet device, or head-mounted display of user devices 140b, 140c, and 140d, respectively).

From the foregoing it can be appreciated that user interface 124 of embodiments is configured to interface with various configurations of user devices (e.g., user devices 140a-140d) supporting multiple modes of human-computer interaction. For example, user interface 124 of embodiments may comprise a graphical user interface (GUI) accepting input by digital pointer (e.g., mouse, stylus, touch screen, etc.), movement observation (e.g., optical gesture recognition, point of gaze eye tracking, etc.), and/or the like. It should be appreciated that a GUI implementation of user interface 124 of embodiments herein may be configured not only to provide output of data and otherwise interact with shipper personnel using graphical objects and constructs, but is preferably configured to provide output of data and otherwise interact with shipper personnel using augmentation (e.g., under control of augmented reality engine 122) of a live view presented to shipper personnel to facilitate efficient performance of fulfillment physical tasks. Additionally or alternatively, user interface 124 of embodiments may comprise an audible user interface (AUI) accepting input by user utterances (e.g., voice commands, spoken phrases, phonemes, etc.), sound sampling (e.g., recognition of sounds correlated with particular activities, identification of periods of silence or lack of particular sounds indicative of a point in a workflow, etc.), and/or the like. It should be appreciated that a AUI implementation of user interface 124 of embodiments herein may be configured not only to accept input of regimented commands and other predefined utterances, but is preferably configured to accept input of unscripted and unregimented utterances (e.g., voice and/or sound) to facilitate fluid interaction (e.g., under control of natural protocol engine 121) with the fulfillment management system by shipper personnel.

It should be appreciated that, although user interface 124 is shown disposed in physical task interaction controller 120 of the illustrated embodiment, some or all of the functionality of user interfaces implemented in accordance with concepts herein may be provided in other configurations. For example, some portion of user interface 124 (e.g., a client applet) may be provided within user devices of embodiments (e.g., any or all of user devices 140a-140d) to facilitate operation as described herein.

Figure 2:
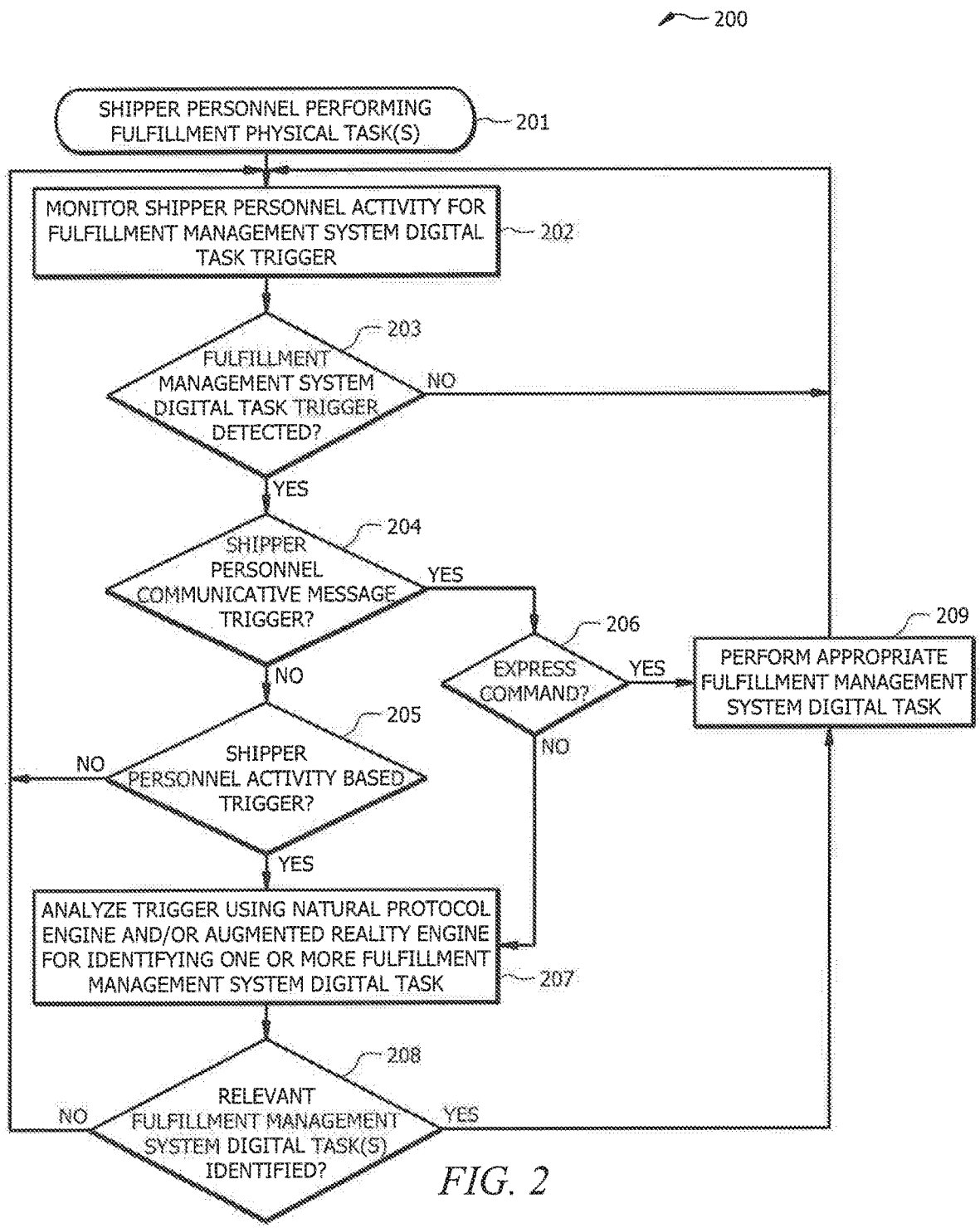
FIG. 2 shows a flow diagram of operation of a physical task interaction controller in accordance with embodiments of the present invention.

Flow 200 of FIG. 2 shows a high level flow diagram of exemplary operation of physical task interaction controller 120 providing physical task interaction control for functions of fulfillment management system 110. In operation according to flow 200 of the illustrated embodiment, shipper personnel are performing one or more fulfillment physical tasks, wherein performing one or more fulfillment management system digital tasks relevant to a fulfillment physical task currently being performed by the shipper personnel is provided. Accordingly, flow 200 of the illustrated embodiment is shown as being performed as shipper personnel are performing fulfillment physical task(s) (block 201). For example, physical task interaction controller 120 may perform functions of exemplary flow 200 while shipper personnel of fulfillment facility 130 perform various fulfillment physical tasks, such as picking items (e.g., items 160a and 160b) from inventory (e.g., items 160), packing items (e.g., items 160a and 160b) into shipping containers (e.g., container 170), attaching shipping documents (e.g., packing lists, shipping labels, shipping manifests, etc. of fulfillment documents 190, such as shipping label 190a) to shipping containers (container 170), or preparing packages (e.g., package 180) for shipping service provider pickup, etc.

At block 202 of flow 200 illustrated in FIG. 2, physical task interaction controller 120 of embodiments monitors shipper personnel activity for a fulfillment management system digital task trigger. In operation according to embodiments, physical task interaction controller 120 may utilize user interface 124 to monitor for various occurrences (e.g., sounds, gestures, events, silence, inactivity, etc.) during the performance of a fulfillment physical task by shipper personnel. For example, logic of physical task interaction controller may monitor various aspects of inputs to user interface 124 as may be provided by any of user devices 140a-140d in use by the shipper personnel to detect particular occurrences. Such inputs may, for example, comprise spoken phrases, ambient sounds (e.g., sounds corresponding to particular activities), etc. as may be captured by a microphone of a user device, digital communications (e.g., texts, emails, instant messages, etc.) as may be generated using a user device, gestures as may be captured by a touch screen and/or camera of a user device, inactivity (e.g., period of silence, lack of motion, etc. indicative of a point in a workflow) as may be observed by an accelerometer, microphone, and/or camera of a user device, and/or the like. It should be appreciated that, although examples are provided above with respect to monitoring for occurrences using user interface inputs provided by one or more user device, embodiments are not limited to monitoring for occurrences based upon inputs provided by user devices. For example, information available from various resources available in correspondence to the shipper personnel performing fulfillment physical tasks (e.g., security cameras, microphones, proximity detectors, radio frequency identification (RFID) detection equipment, motion detectors, access panels, etc., such as may be deployed within a fulfillment facility in which fulfillment physical tasks are being performed, and as may be interfaced with physical task interaction controller 120, such as using user interface 124 or another means of interfacing) may be used in addition to, or in the alternative to, information available from the aforementioned user devices.

A determination is made regarding detection of a fulfillment management system digital task trigger at block 203 of the illustrated embodiment of flow 200. In operation according to embodiments, various observed occurrences may be analyzed (e.g., using logic of natural protocol engine 121 and/or augmented reality engine 122 to detect particular words or phrases, gestures, activities, etc.) at block 203 to identify the presence of a trigger corresponding to a fulfillment management system digital task. Embodiments of physical task interaction controller 120 may, however, detect the presence of general occurrences (e.g., spoken utterances, motion, activity, etc.) at block 203 that may be indicative of the presence of a putative trigger that may correspond to a fulfillment management system digital task, such as where analysis to confirm the presence of a trigger corresponding to a particular fulfillment management system digital task may be performed subsequently, such as at blocks 204, 205, 207, and/or 208.

If it is determined that no fulfillment management system digital task trigger has been detected at block 203, processing according to the illustrated embodiment returns to block 202 for continued monitoring of shipper personnel activity for a fulfillment management system digital task trigger. However, if it is determined that a fulfillment management system digital task trigger, or putative fulfillment management system digital task trigger, has been detected at block 203, processing according to the illustrated embodiment proceeds to block 204 for processing to determine further aspects of the fulfillment management system digital task trigger.

At block 204 of the embodiment illustrated in FIG. 2, a determination is made regarding whether the fulfillment management system digital task trigger comprises a communicative message trigger. For example, logic of physical task interaction controller 120 may analyze an observed occurrence (e.g., using logic of natural protocol engine 121 to detect particular words or phrases, communicative gestures, etc.) at block 203 to identify the presence of a communicative message within the fulfillment management system digital task trigger. Embodiments of physical task interaction controller 120 may, however, detect the presence of general features (e.g., presence of any words, motion suggestive of a gesture, etc.) at block 204 that may be indicative of the presence of a putative communicative message within the trigger, such as where analysis to determine the particular communicative message may be performed subsequently, such as at blocks 206, 207, and/or 208.

If the fulfillment management system digital task trigger comprises a communicative message, logic of physical task interaction controller 120 may be employed for further analyzing the trigger to determine if logic natural protocol engine 121 and/or augmented reality engine 122 should be employed or further employed with respect to the trigger. Accordingly, if it is determined that the fulfillment management system digital task trigger comprises a communicative message trigger at block 204, processing according to the illustrated embodiment of flow 200 proceeds to block 206 for determining further aspects of the communicative message of the fulfillment management system digital task trigger.

In operation according to the illustrated embodiment, a determination regarding the communicative message comprising an express command is made at block 206. For example, one or more predefined, regimented commands (e.g., simple commands, such as print, open, close, cancel, etc.) may be defined with respect to features of fulfillment management system 110, wherein the particular occurrence detected may comprise one or more such commands. Accordingly, embodiments of physical task interaction controller 120 (e.g., logic of natural protocol engine 121) may operate to identify such express commands within a fulfillment management system digital task trigger and proceed to block 209 to initiate the associated fulfillment management system digital task associated therewith (e.g., without invoking, or further invoking, natural protocol engine 121) if it is determined that a communicative message of the fulfillment message system digital task trigger comprises an express command at block 206. However, embodiments of physical task interaction controller 120 facilitate fluid (e.g., unscripted and/or unregimented) interaction with the fulfillment management system by shipper personnel performing various fulfillment physical tasks for performing one or more associated fulfillment management system digital tasks. Accordingly, if it is determined that a communicative message of the fulfillment management system digital task trigger does not comprise an express command at block 206, processing according to the illustrated embodiment of flow 200 proceeds to block 207 for further analysis of the communicative message to facilitate fluid interaction (e.g., to provide emulation of natural human communications) in accordance with concepts herein.

Referring again to the determination of block 204, if it is determined that the fulfillment management system digital task trigger does not comprise a communicative message, processing according to the illustrated embodiment of flow 200 proceeds to block 205 for processing to determine further aspects of the fulfillment management system digital task trigger. For example, embodiments of physical task interaction controller 120 supports activity based fulfillment management system digital task triggers and/or other non-linguistic or communicative message based fulfillment management system digital task triggers. Accordingly, at block 205 of embodiments, a determination is made regarding whether the fulfillment management system digital task trigger comprises an activity based trigger. For example, logic of physical task interaction controller 120 may analyze an observed occurrence (e.g., using logic of augmented reality engine 122 to detect particular events, periods of silence, periods of lack of motion, periods of inactivity, ambient sounds, etc.) at block 203 to identify the presence of relevant activity within the fulfillment management system digital task trigger. Embodiments of physical task interaction controller 120 may, however, detect the presence of general activity (e.g., presence of any activity (e.g., any motion, activity, sound, etc.) at block 205 that may be indicative of the presence of a putative activity based trigger, such as where analysis to determine the particular fulfillment message system digital task activity based trigger may be performed subsequently, such as at blocks 207 and/or 208.

If it is determined at block 205 that the fulfillment management system digital task trigger does not comprise an activity based trigger (e.g., the putative trigger which is neither a communicative message trigger nor an activity based trigger is determined not to comprise a fulfillment management system digital task trigger), processing according to the illustrated embodiment returns to block 202 for continued monitoring of shipper personnel activity for a fulfillment management system digital task trigger. However, if it is determined that the fulfillment management system digital task trigger comprises an activity based trigger at block 205, processing according to the illustrated embodiment of flow 200 proceeds to block 207 for further analysis of the communicative message to facilitate efficiency with respect to performing the tasks (e.g., to providing guidance to shipper personnel performing various fulfillment physical tasks) in accordance with concepts herein.

At block 207 of embodiments of flow 200, further analysis with respect to the fulfillment management system digital task trigger is provided by logic of physical task interaction controller 120 (e.g., natural protocol engine 121 and/or augmented reality engine 122) for identifying one or more fulfillment management system digital task relevant to the fulfillment management system digital task trigger and/or the fulfillment physical task(s) being performed. For example, the fulfillment management system digital task trigger itself (e.g., the sounds, gestures, activity, silence, inactivity, etc. of the trigger analyzed) by logic of natural protocol engine 121 and/or augmented reality engine 122 for indication of a directive with respect to one or more fulfillment management system digital task (e.g., detect natural human communications invoking a digital task, identify sounds corresponding to particular physical activities for which a digital task is associated, identify a particular activity within a physical task workflow for which a digital task is associated, identify a particular inactivity period within a physical task workflow for which a digital task is associated, etc.). Embodiments of the invention may additionally or alternatively analyze information external to a fulfillment management system digital task trigger (e.g., the status of a fulfillment physical task workflow, such as may be determined using information from one or more systems of fulfillment management system 110 (e.g., accounting 111, inventory management 112, order management 113, fulfillment processing 114, and/or shipping processing 115), from resources deployed within the fulfillment facility (e.g., access panels, motion detectors, security equipment, proximity detectors, etc.), and/or the like.

In operation at block 207 of embodiments of physical task interaction controller 120 where a fulfillment management system digital trigger is determined to comprise a communicative message that is not an express command, natural protocol engine 121 may analyze the trigger for determining if the communicative message is a directive with respect to a fulfillment management system digital task. Such operation facilitates fluid (e.g., unscripted and/or unregimented) interaction with the fulfillment management system by shipper personnel performing various fulfillment physical tasks to simultaneously perform one or more associated fulfillment management system digital tasks. Natural protocol engine 121 may, for example, comprise a natural language parsing rule set, language construct database, fulfillment management system operation mapping, and/or other natural language functionality for analyzing shipper personnel free-form commands received by user interface 124 concurrently with performance of an associated fulfillment physical task by the shipper personnel. The free-form commands may be issued by shipper personnel as spoken phrases, digital communications (e.g., texts, emails, instant messages, etc.), gestures, and/or other natural human forms of communication, as well as combinations thereof. Accordingly, analysis of various putative triggers by natural protocol engine 121 is not limited to linguistics (i.e., spoken or written language), and may include other communicative messages (e.g., natural language parsing rule sets, language construct databases, and other natural language functionality for analyzing shipper personnel free-form commands may be configured for operation with respect to non-spoken/written language, such as gestures). In operation according to embodiments, natural protocol engine 121 operates to identify one or more fulfillment management system digital task relevant to the fulfillment management system digital task trigger and transform such free-form commands to appropriate control commands for implementing the functionality of the identified fulfillment management system digital task.

In operation at block 207 of embodiments of physical task interaction controller 120 where a fulfillment management system digital trigger is determined to comprise an activity based trigger, augmented reality engine 122 may provide guidance relevant to the activity to shipper personnel performing various fulfillment physical tasks, such as to facilitate efficiency with respect to performing the tasks (e.g., shipper personnel efficiency, resource utilization efficiency, etc.), by simultaneously performing one or more fulfillment management system digital tasks to identify and deliver information to the shipper personnel relevant to efficient performance of the fulfillment physical task. Augmented reality engine 122 may, for example, provide perceptual information (e.g., appropriate/relevant visual, auditory, haptic, somatosensory, and/or olfactory information) overlaid in a live view (e.g., direct or indirect view provided by any of user devices 140a-140d) presented to the shipper personnel. For example, augmentation of a live view perceived by shipper personnel with fulfillment physical task guidance information by augmented reality engine 122 may be in response to a determination that shipper personnel is performing a particular aspect of a fulfillment physical task workflow for which relevant fulfillment physical task guidance is available. Accordingly, analysis of various putative triggers by artificial intelligence engine 123 may analyze the trigger and/or information external thereto for determining if the fulfillment management system digital task (e.g., providing relevant augmentation information) is associated with the activity. In facilitating the foregoing, augmented reality engine 122 of embodiments may comprise a fulfillment physical task workflow database, a fulfillment physical task workflow guidance rule set, an inventory detail database, fulfillment physical task guidance information mapping, and/or other reality augmentation functionality for interacting with shipper personnel via user interface 124 concurrently with performance of an associated fulfillment physical task by the shipper personnel.

It should be appreciated that operation of natural protocol engine 121 and augmented reality engine 122 to analyze one or more fulfillment management system digital task trigger at block 207 may be performed cooperatively. For example, augmentation of a live view perceived by shipper personnel with fulfillment physical task guidance information by augmented reality engine 122 may be in response to commands or requests issued by shipper personnel (e.g., as spoken phrases, digital communications, gestures, etc.). Accordingly, various features of augmented reality engine 122 may operate in cooperation with functionality of natural protocol engine 121 according to embodiments of the invention.

Having analyzed the fulfillment management system digital task trigger for identifying one or more fulfillment management system digital task relevant to the trigger and/or the fulfillment physical task(s) being performed at block 207, processing according to the illustrated embodiment of flow 200 proceeds to block 208 wherein a determination is made regarding whether a fulfillment management system digital task relevant to the fulfillment physical task being performed has been identified. If no fulfillment management system digital task relevant to the fulfillment physical task being performed has been identified (e.g., the putative fulfillment management system digital task trigger was determined not to in fact be a trigger for a fulfillment management system digital task), processing according to the illustrated embodiment returns to block 202 for continued monitoring of shipper personnel activity for a fulfillment management system digital task trigger. However, if it is determined that a fulfillment management system digital task relevant to the fulfillment physical task being performed has been identified, processing according to the illustrated embodiment proceeds to block 209 for performing the identified fulfillment management system digital task.

At block 209, physical task interaction controller 120 of embodiments to controls initiation of one or more fulfillment management system digital tasks associated with the fulfillment management system digital task trigger and/or the fulfillment physical task(s) being performed. For example, physical task interaction controller 120 (e.g., logic of natural protocol engine 121) may provide appropriate control signals (e.g., express commands) to various functionality of fulfillment management system 110 for performing an appropriate fulfillment management system digital task relevant to performance of a fulfillment physical task by shipper personnel (e.g., controlling a particular function of any or all of accounting 111, inventory management 112, order management 113, fulfillment processing 114, and/or shipping processing 115). The particular fulfillment system digital tasks initiated may, for example, be derived from free-form commands received from shipper personnel, determined based upon particular activities or points in a workflow detected with respect to the fulfillment physical task, etc. Additionally or alternatively, physical task interaction controller 120 (e.g., logic of augmented reality engine 122) may provide appropriate control signals (e.g., data access requests, media play requests, etc.) to various functionality of fulfillment management system 110 for performing a fulfillment management system digital task to deliver augmentation information relevant to performance of a fulfillment physical task by shipper personnel (e.g., retrieving information from any or all of accounting 111, inventory management 112, order management 113, fulfillment processing 114, shipping processing 115, and/or database 116 and to provide perceptual information overlaid in a live view presented to the shipper personnel). Thereafter, processing according to the illustrated embodiment of flow 200 returns to block 202 for continued monitoring of shipper personnel activity for a fulfillment management system digital task trigger.

It should be appreciated that artificial intelligence engine 123 of embodiments may monitor operation of physical task interaction controller 120 providing physical task interaction control for functions of fulfillment management system 110 (e.g., monitor operational aspects of flow 200) for providing self-learning to modify operation of one or more aspect of physical task interaction controller 120 based upon previous operation and aspects thereof. For example, artificial intelligence engine 123 may include self-learning fuzzy logic algorithms configured to learn from operations performed using physical task interaction controller 120 and understand aspects of normal behavior (e.g., as distinguished from abnormal or unusual behavior), wherein various assumptions (e.g., for use in facilitating fluid interaction with fulfillment management system 110 by shipper personnel and/or providing guidance to shipper personnel performing various fulfillment physical tasks) may be made based upon the observed operations. In operation according to embodiments, assumptions and/or other information learned from operations observed by logic of artificial intelligence engine 123 is used to refine or otherwise modify one or more rule sets (e.g., a natural language parsing rule set, a natural language grammar rule set, a fulfillment physical task workflow guidance rule set, etc.) utilized by physical task interaction controller 110 of embodiments. Accordingly, it should be appreciated that embodiments of artificial intelligence engine 123 may operate in cooperation with natural protocol engine 121, such as for analyzing shipper personnel free-form commands and/or fulfillment management system digital task control information and modifying one or more aspect of natural protocol engine 121 based upon the analysis and aspects of normal behaviors determined therefrom. Additionally or alternatively, embodiments of artificial intelligence engine 123 may operate in cooperation with augmented reality engine 122, such as for analyzing fulfillment physical task workflows, aspects of fulfillment physical tasks, etc. and modifying one or more aspect of augmented reality engine 122 based upon the analysis and aspects of normal behaviors determined therefrom.

Having generally described operation of embodiments of physical task interaction controller 120 for providing physical task interaction control of functions of fulfillment management system 110 according to flow 200 illustrated in FIG. 2, particular example scenarios of the operation are provided below to aid in understanding the concepts herein. It should be understood that the examples given are not exhaustive of the fulfillment physical tasks and associated fulfillment management system digital tasks that may be supported by embodiments of the invention, but rather are a representative set believed to illustrate various aspects of concepts of the present invention.

In an example scenario for operation of physical task interaction controller 120 providing physical task interaction control of functions of fulfillment management system 110, an individual of fulfillment facility 130 shipper personnel is performing an order picking and packing workflow fulfillment physical task (e.g., packing items 160a and 160b in container 170) to prepare a package (e.g. package 180) for shipment to fulfil an order. The individual may have their hands full with handling the items, manipulating the flaps of the container to incarcerate the items, and dispensing packing tape to seal the container, and thus not be free to engage in tactile interaction with a user device (e.g., any of user devices 140a-140c) to initiate a desired fulfillment management system digital task (e.g., generate and print a shipping label for the package). Employing functionality of physical task interaction controller 120 of embodiments of the invention, the foregoing individual may nevertheless provide a communicative massage (e.g., make a natural language declarative or directive), such as by saying "Hey, Shipping Easy, find a label for order one-two-three-four-five," to cause a shipping label (e.g., shipping label 190a) for the package (e.g., package 180) to be generated and/or printed. Physical task interaction controller 120 (e.g., using logic of natural protocol engine 121) may identify the spoken phrase as a fulfillment management system digital task trigger, analyze the trigger to determine one or more particular fulfillment management system digital tasks to perform (e.g., generate a shipping label for the order using shipping processing 115 with data provided by order management 113, and print the shipping label using printer 141a under control of shipping processing 115). It should be appreciated from the foregoing that the operation of physical task interaction controller 120 may not only utilize the identified fulfillment management system digital task trigger in identifying and/or performing the digital tasks, but may utilize other information available to the physical task interaction controller (e.g., information regarding the activity of the shipper personnel, information about the workflow of the fulfillment physical task, information from or relevant to one or more functional units of the fulfillment management system, etc.). Using such other information (e.g., information regarding the activity of the shipper personnel and/or information about the workflow of the fulfillment physical task, such as may provide a current location of the individual or a location at which the package is to be completed), for example, a particular resource (e.g., printer 141a) used with respect to the performance of the fulfillment management system digital task may be selected. Accordingly, the individual may continue the fulfillment physical task workflow to complete the package, while simultaneously being provided a needed shipping label readily accessed by the individual and applied to the package for completion of the package. It can be appreciated that the shipping personnel individual in this example has interacted with, and controlled operations of, fulfillment management system 110 relevant to the fulfillment physical task being performed by the individual without either the need for separate personnel to perform the digital tasks or the shipper personnel having to leave the fulfillment physical task.

Continuing with the above example scenario for operation of physical task interaction controller 120 providing physical task interaction control of functions of fulfillment management system 110, the shipper personnel individual having completed the package for an order then being processed may provide a communicative massage (e.g., make a natural language declarative or directive), such as by saying "Hey, Shipping Easy, what's my next unprocessed order? What are the items in that order?" Physical task interaction controller 120 (e.g., using logic of natural protocol engine 121) may identify the spoken phrases as fulfillment management system digital task triggers, analyze the triggers to determine one or more particular fulfillment management system digital tasks to perform (e.g., locate a next open order using order management 113 and generate a pick list for the order using fulfillment processing 114 with data provided by order management 113). Although embodiments of physical task interaction controller 120 may operate to print a pick list (e.g., using printer 141a under control of fulfillment processing 114), in this example scenario physical task interaction controller 120 may utilize user interface 124 to issue a communicative message, such as to say "There are two black I-Phone sets in classic cases in the next open order," to provide the pick ticket information to the individual.

Figure 3A:
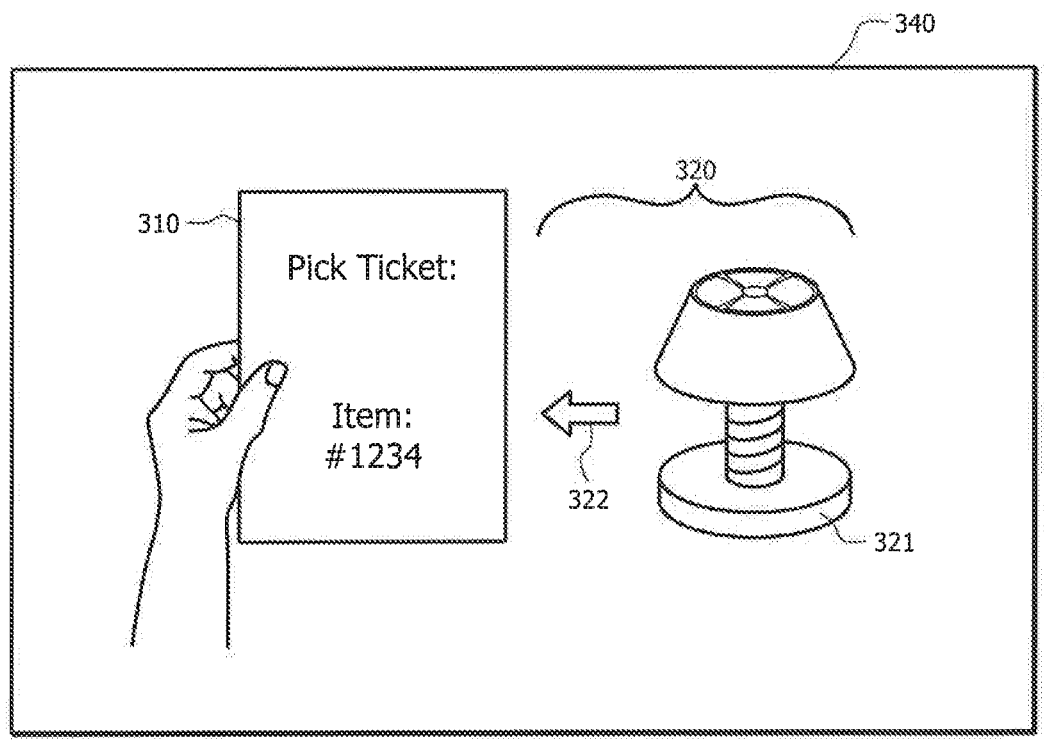
FIGS. 3A and 3B show overlay of information in live views by a physical task interaction controller of embodiments of the present invention.
Figure 3B:
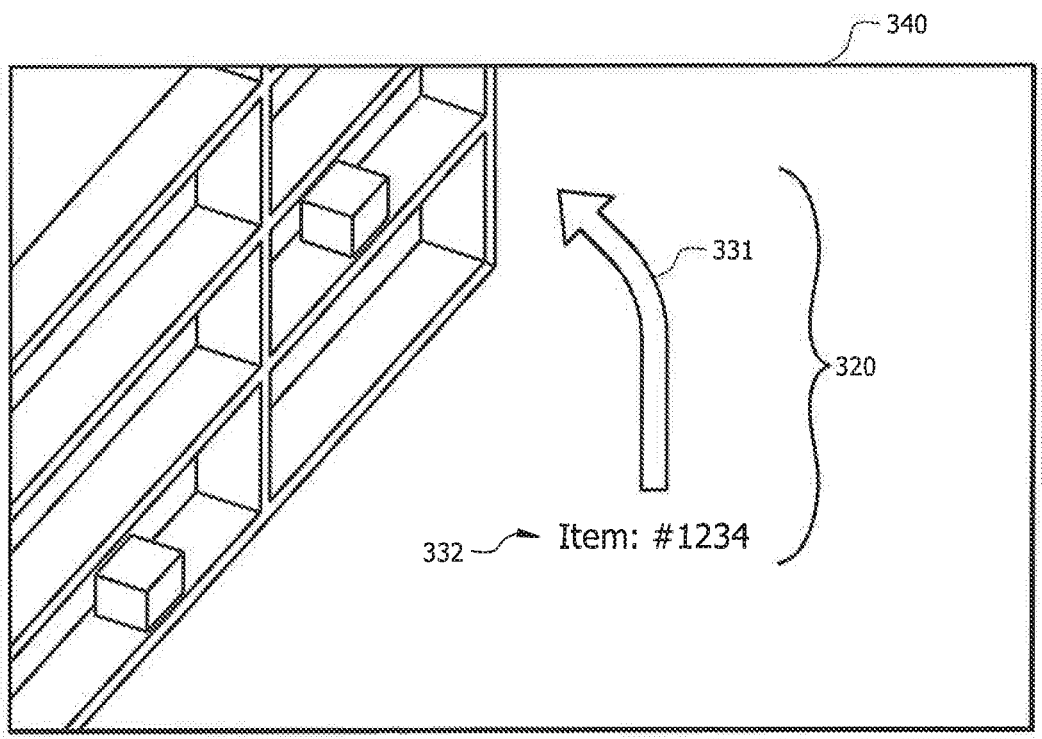

Operation of physical task interaction controller 120 in the foregoing scenario may include providing guidance relevant to the shipper personnel individual performing the item picking fulfillment physical task. For example, physical task interaction controller 120 (e.g., using logic of augmented reality engine 122) may provide information regarding the items to be picked for the order (e.g., images of the items to facilitate picking of the proper items from inventory, directions to the location of the items within the fulfillment facility to expedite picking of the items, etc.), such as augmented information presented in a live view presented to the individual shipper personnel (e.g., using a camera and display of any of user devices 140b-140d). FIGS. 3A and 3B illustrate operation wherein the fulfillment management system digital task comprises obtaining information from the fulfillment management application for presentation to the individual of the shipper personnel in an overlay of a live view presented by a user device of the user devices to provide guidance to the individual of the shipper personnel in performing the fulfillment physical task in accordance with the above examples. In particular, in the example of FIG. 3A, a user device utilized by shipper personnel (e.g., any of user devices 140a-140d) provides live view 340 (e.g., as may be displayed upon a display screen of the user device, projected upon one or more lenses of the user device, etc.) in which information of pick ticket 310 held and viewed by the shipper personnel is augmented with information 320 regarding the item to be picked for the order (e.g., displaying item image 321 to facilitate picking of the proper item from inventory and relational designator 322 to show the association between information in the live view and the item image) to expedite picking of the items. In the example of FIG. 3B, a user device utilized by shipper personnel (e.g., any of user devices 140a-140d) provides live view 340 (e.g., as may be displayed upon a display screen of the user device, projected upon one or more lenses of the user device, etc.) augmented with information 320 providing directions to the location of one or more items for fulfilling an order currently being processed are located within the fulfillment facility (e.g., displaying item designator 331 to identify an item in the order being processed and guidance designator 332 to provide directions to the shipper personnel to the designated item) to expedite picking of the items. The trigger for the presentation of such augmented information may comprise knowledge of the point in the fulfillment physical workflow the individual is currently performing (e.g., based upon the above mentioned communicative messages, analyzing activity of the individual, etc.). Additionally or alternatively, the shipper personnel individual may request such guidance, such as using communicative message (e.g., a natural language declarative or directive) similar to those above.

In operation according to an exemplary embodiment, the shipper personnel individual performing the picking fulfillment physical task may view a pick ticket using a camera of a user device (e.g., any of user devices 140b-140d), wherein the pick ticket provides relatively little information regarding the items (e.g., a SKU number and/or a brief description, such as "purple lip gloss"). Physical task interaction controller 120 (e.g., using logic of augmented reality engine 122) may detect the viewing of the pick ticket as a fulfillment management system digital task trigger and operate to provide augmentation information, such as may comprise an image showing what the item or items look like (e.g., the packaging appearance, the item size, etc.), and overlay that information on the live image viewed by the shipper personnel individual. This information may facilitate picking of the item by the individual, such as by their visually matching the information to the items found in inventory in fulfillment facility 130. Additionally or alternatively, physical task interaction controller 120 (e.g., using logic of augmented reality engine 122) may provide augmentation information overlaid on a live image viewed by the shipper personnel individual that highlights or directs the individual to the location of the item(s) in fulfillment facility 130, such as based on GPS data, proximity detection information, object recognition in the live image, etc.

As a further example of event based fulfillment management system digital tasks that may be performed by physical task interaction controller 120 of embodiments in the exemplary scenario, a summary of picked items for an order may be provided to the shipper personnel (e.g., using logic of natural protocol engine 121 and/or augmented reality engine 122), such as when an item has been picked or when the requisite number of items have been picked for the order. For example, in performing the item picking fulfillment physical task, the shipper personnel individual may pick a plurality of different items, collecting those items in some type of plastic bin or putting them on a conveyer belt, wherein a visual order item summary and/or other information may be useful for verifying that the order is complete and accurate. Accordingly, physical task interaction controller 120 (e.g., using logic of augmented reality engine 122) may provide augmentation information overlaid on a live image viewed by the shipper personnel individual that presents a visual order item summary, such as in response to a fulfillment management system digital task trigger indicating the individual has completed picking items for the order or in response to a communicative message from the shipper personnel individual. Additionally or alternatively, physical task interaction controller 120 (e.g., using logic of natural protocol engine 121) may provide a communicative message regarding the picked items, such as saying "OK, you think you're done picking for this order, you should have four items in this order that look like this" (e.g., in association with the above described visual summary) or "OK, you think you're done picking for this order, you should have four items in this order including [item 1 description], [item 2 description], [item 3 description], and [item 4 description]."

Still continuing with the above example scenario for operation of physical task interaction controller 120 providing physical task interaction control of functions of fulfillment management system 110, assuming that the shipper personnel individual has obtained the items for the order from inventory and completed the package for this order now being processed, the individual may provide a communicative massage (e.g., make a natural language declarative or directive), such as by saying "OK, Shipping Easy, now I'm ready to print a label for this order." In response, physical task interaction controller 120 (e.g., using logic of natural protocol engine 121) may identify the spoken phrase as a fulfillment management system digital task trigger, analyze the trigger to determine one or more particular fulfillment management system digital tasks to perform (e.g., generate a shipping label for the order using shipping processing 115 with data provided by order management 113, and print the shipping label using printer 141a under control of shipping processing 115). It should be appreciated that in this particular example physical task interaction controller 120 may recognize the particular order being processed from the context of the previous interaction between the shipper personnel individual and physical task interaction controller 120.

Extrapolating the above scenario to the end of the work day, the shipper personnel may have completed a number of packages for shipment to various intended recipients. For example, package 180 may be part of a large number of packages (e.g., tens or hundreds of packages) to be shipped by a particular shipping service provider (e.g., USPS, UPS, FedEx, DHL, local courier, regional courier, etc.), wherein an end of day form is needed for the shipping service provider to collect the packages for shipment. In operation according to embodiments of physical task interaction controller 120 (e.g., using logic of natural protocol engine 121), shipper personnel may provide a communicative massage (e.g., make a natural language declarative or directive), such as by saying "Hey, Shipping Easy, print my USPS and end of day form," to initiate generation and printing of the needed end of day form (e.g., using order management 113, fulfillment processing 114, and shipping processing 115).

It should be appreciated that the foregoing exemplary picking and packing scenario is not the only scenario in which operation of physical task interaction controller 120 of embodiments of the invention is applicable. In another example scenario, when responding to a customer inquiry if an individual of the shipper personnel may issue a communicative message (e.g., in the form of a natural language declarative or directive) to physical task interaction controller 120, such as by saying "Hey Shipping Easy, what is the status of order one-two-three-four-five?", in order to solicit information regarding the status of the order to respond to the customer inquiry. Physical task interaction controller 120 (e.g., using logic of natural protocol engine 121) may identify the spoken phrase as a fulfillment management system digital task trigger, analyze the trigger to determine one or more particular fulfillment management system digital tasks to perform (e.g., shipment status inquiry using order management 113 and/or shipping processing 115). Physical task interaction controller 120 may respond with a communicative message (e.g., using logic of natural protocol engine 121), such as to announce that "it's in transit with USPS and it will be delivered in one to two days."

In a further example scenario for operation of physical task interaction controller 120 providing physical task interaction control of functions of fulfillment management system 110, an individual of fulfillment facility 130 shipper personnel is performing an inventory count. As can be appreciated from the example of fulfillment management system 110 illustrated in FIG. 1, fulfillment management systems utilized according to embodiments of the invention may have inventory capabilities. Accordingly, the shipper personnel individual that is physically counting inventory items may issue a communicative message (e.g., in the form of a natural language declarative or directive) to physical task interaction controller 120, such as by saying "Hey Shipping Easy, how many outstanding orders do I have for this blue sweater?", possibly capturing an image of the subject blue sweater using a camera of a user device (e.g., any of user devices 140a-140d). In response, physical task interaction controller 120 (e.g., using logic of natural protocol engine 121 accessing information of inventory management 112 and order management 113) can access the relevant information and generate an appropriate response, such as to say, "There are seven open orders for that blue sweater." The shipper personnel individual may use the information provided to confirm that a sufficient number of items are in inventory to fill the orders, perhaps with some excess number for future orders, and if not respond with a communicative message to order more inventory, such as by saying "Hey, Shipping Easy, open a PO for blue sweaters. I need five more." In response, physical task interaction controller 120 (e.g., using logic of natural protocol engine 121 providing commands to accounting 111 and/or inventory management 112) can operate to generate and issue the order for inventory.

In a still further example scenario for operation of physical task interaction controller 120 providing physical task interaction control of functions of fulfillment management system 110, an individual of fulfillment facility 130 shipper personnel may be physically interacting with a package (e.g., package 180), such as a package found out of place within fulfillment facility 130 or otherwise that the disposition of which is unknown. The shipper personnel individual may capture an image of the shipping label (e.g., shipping label 190a), such as using a camera of a user device (e.g., any of user devices 140b-140d). Physical task interaction controller 120 (e.g., using logic of augmented reality engine 122) may detect the viewing of the shipping label as a fulfillment management system digital task trigger and operate to provide augmentation information, such as may comprise information related to that package (e.g., an image of the contents, information regarding the intended recipient, information regarding when the package was packed, information showing the suggested delivery date, etc.), and overlay that information on the live image viewed by the shipper personnel individual. In operation according to embodiments, the augmented data provides shipper personnel with access to pertinent order data, customer data, order history information, logistical data related to that label by just looking at the label. This information may facilitate appropriate handling of the package (e.g., determining that the intended recipient is an excellent or repeat customer and shipment of the package is overdue and thus expedited handling and/or messaging the recipient is warranted, determining that the contents are perishable and may have exceeded a viability date and thus are subject to replacement prior to shipment of the package, etc.).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A fulfilment management system comprising:
one or more fulfilment management applications configured to provide functionality for fulfilment of orders and shipment of items, wherein a fulfilment management application of the one or more fulfilment management applications is configured to perform a plurality of shipping document tasks corresponding to a shipping task performed by shipper personnel in a fulfilment facility; and
a physical task interaction controller configured to interface with a plurality of user devices and provide a user interface accessed by user devices of the plurality of user devices for fulfilment of orders and shipment of items, wherein the physical task interaction controller is configured to monitor activity of the shipper personnel and detect a fulfilment management system digital task trigger occurring during the shipping task being performed by an individual of the shipper personnel in the fulfilment facility, wherein the physical task interaction controller includes a natural protocol engine, an augmented reality engine, and a workflow database in which the shipping task is part of a workflow, wherein the natural protocol engine and the augmented reality engine are configured to operate in cooperation with the user interface to provide physical task interaction control initiating the plurality of shipping document tasks corresponding to the shipping task being performed by the individual based upon the fulfilment management system digital task trigger detected by the physical task interaction controller in association with the shipping task of the workflow being performed by the individual, wherein the fulfilment management system digital task trigger is detected based at least in part on the physical task interaction controller identifying an activity based trigger corresponding to particular activity or inactivity within the workflow of the shipping task as performed by the individual;
wherein the augmented reality engine is configured to analyze the activity based trigger of the fulfilment management system digital task trigger for identifying the plurality of shipping document tasks relevant to the fulfilment management system digital task trigger, and provide a control signal to the fulfilment management application for initiating the plurality of shipping document tasks relevant to performance of the shipping task, and wherein the plurality of shipping document tasks include generating a shipping label for a fulfilment item being processed by the individual and printing the shipping label at a printer selected by the physical task interaction controller based on information regarding the activity of the individual.

2. The fulfilment management system of claim 1, wherein the fulfilment management system digital task trigger comprises a communicative message in the form of a natural language directive, and wherein the natural protocol engine is configured to analyze the communicative message for identifying the plurality of shipping document tasks relevant to the fulfilment management system digital task trigger.

3. The fulfilment management system of claim 2, wherein the natural protocol engine provides a control signal to the fulfilment management application for performing the plurality of shipping document tasks relevant to performance of the shipping task by the individual of the shipper personnel.

4. The fulfilment management system of claim 2, wherein the natural protocol engine is further configured to analyze the shipping task being performed by the individual of the shipper personnel for identifying the plurality of shipping document tasks relevant to the fulfilment management system digital task trigger.

5. The fulfilment management system of claim 1, wherein the physical task interaction controller further includes an artificial intelligence engine configured to implement modifications to operation of the physical task interaction controller based upon observed operation.

6. The fulfilment management system of claim 5, wherein the artificial intelligence engine is configured to cooperate with the natural protocol engine for analyzing shipper personnel communicative messages and modifying one or more aspect of the natural protocol engine based upon the analyzing and aspects of normal behaviors determined from the analyzing.

7. The fulfilment management system of claim 5, wherein the artificial intelligence engine is configured to cooperate with the augmented reality engine for analyzing shipping task workflows of the workflow database and aspects of shipping tasks and modifying one or more aspect of the augmented reality engine based upon the analyzing and aspects of normal behaviors determined from the analyzing.

8. A method for controlling plurality of shipping document tasks corresponding to a shipping task performed by shipper personnel in a fulfilment facility using a fulfilment management system, the method comprising: providing a physical task interaction controller configured to interface with a plurality of user devices and provide a user interface accessed by user devices of the plurality of user devices for fulfilment of orders and shipment of items, wherein the physical task interaction controller includes a natural protocol engine, an augmented reality engine, and a workflow database in which the shipping task is part of a workflow, wherein the natural protocol engine and the augmented reality engine are configured to operate in cooperation with the user interface to provide physical task interaction controller of a fulfilment management application of one or more fulfilment management applications of the fulfilment management system to perform the plurality of shipping document tasks corresponding to the shipping task performed by the shipper personnel, wherein the plurality of shipping document tasks include generating a shipping label for a fulfilment item being processed by the shipper personnel and printing the shipping label; monitoring, by the physical task interaction controller, activity of an individual of the shipper personnel performing the shipping task of the workflow in the fulfilment facility for a fulfilment management system digital task trigger; detecting, by the physical task interaction controller based at least in part on analyzing the activity of the individual, an activity based trigger occurring during the shipping task currently being performed by the individual, wherein the fulfilment management system digital task trigger is detected based at least in part on the physical task interaction controller identifying particular activity or inactivity within the workflow of the shipping task as performed by the individual; and when the activity based trigger is detected by the physical task interaction controller, analyzing, by the augmented reality engine, the activity based trigger of the fulfilment management system digital task trigger for identifying the plurality of shipping document tasks relevant to the fulfilment management system digital task trigger, and providing, by the augmented reality engine, a control signal to the fulfilment management application for initiating the plurality of shipping document tasks relevant to performance of the shipping task, whereby the fulfilment management application controls generating the shipping label for the fulfilment item being processed by the individual and printing the shipping label at a printer selected by the physical task interaction controller based on information regarding the activity of the individual.

9. The method of claim 8, wherein the fulfilment management system digital task trigger comprises a communicative message in the form of a natural language directive, the method further comprising: analyzing, by the natural protocol engine, the natural language directive for identifying the plurality of shipping document tasks relevant to the fulfilment management sysyem digital task trigger.

10. The method of claim 9, wherein when the communicative message is detected by analyzing the fulfilment management system digital task trigger, the method further comprising:
analyzing, by the natural protocol engine, the shipping task being performed by the individual of the shipper personnel for identifying the plurality of shipping document tasks relevant to the fulfilment management system digital task trigger.

11. The method of claim 8, wherein the physical task interaction controller further includes an artificial intelligence engine configured to implement modifications to operation of the physical task interaction controller based upon observed operation.

12. The method of claim 11, further comprising: analyzing, by the artificial intelligence engine in cooperation with the natural protocol engine, shipper personnel communicative messages; and modifying, by the artificial intelligence engine, one or more aspect of the natural protocol engine based upon the analyzing and aspects of normal behaviors determined from the analyzing.

13. The method of claim 11, further comprising: analyzing, by the artificial intelligence engine in cooperation with the augmented reality engine, shipping task workflows of the workflow database and aspects of shipping tasks; and modifying, by the artificial intelligence engine, one or more aspect of the augmented reality engine based upon the analyzing and aspects of normal behaviors determined from the analyzing.

* * * * *

UNITED STATES PATENT AND TRADEMARK OFFICE
CERTIFICATE OF CORRECTION

PATENT NO. : 11,195,141 B2  
APPLICATION NO. : 15/950814  
DATED : December 7, 2021  
INVENTOR(S) : Barry Neal Cox Page 1 of 1

It is certified that error appears in the above-identified patent and that said Letters Patent is hereby corrected as shown below:

In the Specification

At Column 6, Line number 19, delete "system 10" and replace with --system 110--.
At Column 9, Line number 22, delete "AIX" and replace with --A1X--.

In the Claims

At Column 23, Claim number 8, Line number 31, delete "controlling plurality" and replace with --controlling a plurality--.
At Column 24, Claim number 9, Line number 27, delete "sysyem" and replace with --system--.

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*